Patented July 19, 1932

1,868,042

UNITED STATES PATENT OFFICE

ISAY A. BALINKIN AND CLIFFORD F. MUTH, OF CINCINNATI, OHIO

IRRADIATION PROCESS

No Drawing.    Application filed March 23, 1929.    Serial No. 349,512.

Our invention relates to bee keeping, and involves a new and novel treatment of queen bees, which results in increased egg laying and causing the worker bees hatched from the eggs laid by such treated queen bees to be more quite and gentle.

It is the practice in bee keeping for the bee keeper to purchase fertilized queen bees for their hives, and the trade has been seeking a type of queen which will react well to domestication, and which is strong and lays as many eggs as possible, and the bees from which will be sturdy, good workers and of such temperament as to permit easy manipulation of the colony.

Hitherto the Cyprian bee has been regarded as the strongest and best worker, but this type of bee is irascible and cannot be handled, so that they have not been bred as extensively as their superior qualities otherwise would warrant.

It is our object to so treat any strain of queen bees whose honey gathering qualities are off-set by the disposition of the worker bees, that the bees from the eggs of such queens will be gentle and easy to handle. We have been successful in doing so, with the result of a considerable commercial development in the sale of gentled queens, Cyprians and others by a controlled ultra violet light irradiation treatment.

According to our approved practice, we irradiate the fertilized queens only, and have no data as to whether irradiation of the queen bee before fertilization will accomplish our object.

As soon as the queen bee is fertilized, it is given in our preferred practice, three treatments to ultra violet light. We use preferably the filtered mercury vapor arc in a quartz tube, since this light is rich in ultra violet and quite low in red and infra red rays. We can substitute a carbon arc of proper type. The filter employed by us is one which permits ultra violet rays up to as high as 2750-3000 Angstrom units to be transmitted. Experiments in which the queen bees were treated without the use of filters resulted in the queen bees becoming sterile after a short period of egg-laying.

With a proper mercury vapor arc, and a sheet of Vita glass capable of transmitting 2750 Angstrom units placed between it and the bees, and with the source of light around 39 inches distant from the bees, we expose them for one minute the first day, two minutes the second day, and five minutes the third day.

The offspring from these treated queens were found to be much gentler as compared to the untreated control colonies. These treated queens also laid from 20 to 30 per cent more eggs than the average lay of queens untreated. We do not believe that the trait of gentleness is carried on to further generations as a sport trait, but if it is, in part, it is obviously not safe to rely upon it in further breeding without irradiation, because we are not able to control the mating of the queen with the drone which may be a hybrid.

We believe that the observed gentleness of the offspring from irradiated queen bees is a result of an effect of the ultra violet light upon the nervous system of the queen bees, which is located on the surface of their bodies.

We are unable to assign the cause of the change in traits of bees in the manner we have described, except that the nervous system of any insect is on the surface of its body and in some fashion, the nervous system of the queen bee, when acted upon at the time that the eggs are becoming fertile, will react upon the nervous system developed in the offspring.

Instead of Vita glass some other filter capable of transmitting up to 2750-3000 Angstrom units and no shorter can be used, and also, as we have indicated, a carbon or metal arc which will give a similar ultra violet radiation.

That this treatment can be hastened or substantially varied seems quite probable. We have given the preferred steps of our process above, but as we believe we are the first to have accomplished this strange permanent transformation in the nervous reactions of bees, we do not limit our invention to this type of treatment or the kind of bee that is treated.

Having thus described our invention, what we claim as new and desire to secure by Letters Patent, is:—

1. The process of gentling bees which consists in irradiating the fertile queen bee with ultra violet light including rays up to substantially 2750–3000 Angstrom units.

2. The process of treating a fertile queen bee which consists in irradiating it with ultra violet light including rays up to substantially 2750–3000 Angstrom units for the purpose described.

3. The process of treating a fertile queen bee which consists in irradiating the queen bee for a series of short intervals of increasing length with ultra violet light having up to 2750 Angstrom units in its rays for the purpose described.

4. The process of treating a fertile queen bee which consists in irradiating it at around 39 inches distance with light poor in heat rays but rich in ultra violet rays up to 2750 Angstrom units, for three successive days, for increasing intervals of around one minute, two minutes and five minutes, for the purpose described.

ISAY A. BALINKIN.
CLIFFORD F. MUTH.